(12) United States Patent
Poletto et al.

(10) Patent No.: US 12,113,444 B2
(45) Date of Patent: Oct. 8, 2024

(54) BIDIRECTIONAL DC/DC CONVERTER

(71) Applicants: STMicroelectronics (Rousset) SAS, Rousset (FR); STMicroelectronics S.r.l., Agrate Brianza (IT)

(72) Inventors: Vanni Poletto, Milan (IT); Antoine Pavlin, Puyricard (FR)

(73) Assignees: STMicroelectronics S.r.l., Agrate Brianza (IT); STMicroelectronics (Rousset) SAS, Rousset (FR)

( * ) Notice: Subject to any disclaimer, the term of this patent is extended or adjusted under 35 U.S.C. 154(b) by 228 days.

(21) Appl. No.: 17/856,657

(22) Filed: Jul. 1, 2022

(65) Prior Publication Data
US 2024/0006998 A1  Jan. 4, 2024

(51) Int. Cl.
*H02M 3/158* (2006.01)
*B60L 53/22* (2019.01)
*B60L 58/20* (2019.01)

(52) U.S. Cl.
CPC .......... *H02M 3/1586* (2021.05); *B60L 53/22* (2019.02); *B60L 58/20* (2019.02); *B60L 2210/12* (2013.01); *B60L 2210/14* (2013.01)

(58) Field of Classification Search
CPC ...... H02M 3/1586; B60L 53/22; B60L 58/20; B60L 2210/12; B60L 2210/15
USPC ....................................................... 361/232
See application file for complete search history.

(56) References Cited

U.S. PATENT DOCUMENTS

| 8,723,490 | B2 * | 5/2014 | Moussaoui | H02M 3/1588 323/284 |
|---|---|---|---|---|
| 9,718,376 | B2 | 8/2017 | Chemin et al. | |
| 10,581,416 | B2 * | 3/2020 | Zhang | G06F 1/12 |
| 2010/0079182 | A1 * | 4/2010 | Lien | H03K 5/1565 327/175 |
| 2010/0201405 | A1 | 8/2010 | Ahmad et al. | |
| 2012/0163035 | A1 * | 6/2012 | Song | H02M 3/33584 363/17 |
| 2018/0115409 | A1 | 4/2018 | Nayyar et al. | |
| 2021/0028704 | A1 | 1/2021 | Jiang et al. | |
| 2021/0239792 | A1 | 8/2021 | Rumpler et al. | |
| 2021/0333819 | A1 | 10/2021 | Mannes Hillesheim et al. | |

OTHER PUBLICATIONS

Analog Devices, "Bidirectional PolyPhase Synchronous Buck or Boost Controller," LTC3871/LTC3871-1, Oct. 2019, 36 pages.
International Rectifier, "8+0/7+1/6+2 Dual Output Digital Multi-Phase Controller," IR35201, Feb. 8, 2015, 60 pages.
Texas Instruments, "Bidirectional DC-DC Converter," TI Designs: TIDA-BIDIR-400-12, TIDUAI7, Sep. 2015, 79 pages.

(Continued)

*Primary Examiner* — Yemane Mehari
(74) *Attorney, Agent, or Firm* — Slater Matsil, LLP

(57) ABSTRACT

In an embodiment, a phase circuit includes: a bidirectional output stage configured to be coupled between a first battery and a second battery; a memory configured to store a number of active phases, and an identifier; and a synchronization circuit configured to receive a first clock signal and determine a start time of a switching cycle of the bidirectional output stage based on the number of active phases, the identifier, and the first clock signal, where the phase circuit is configured to control the timing of the switching of the bidirectional output stage based on the start time.

25 Claims, 7 Drawing Sheets

(56) References Cited

OTHER PUBLICATIONS

Texas Instruments, "TPS53681 Dual-Channel (6-Phase + 2-Phase) or (5-Phase + 3-Phase) D-CAP+TM Step-Down Multiphase Controller with NVM and PMBuTM," Jun. 2017, 130 pages.
Waffler S. et al., "Efficiency Optimization of an Automotive Multi-Phase Bi-directional DC-DC Converter," 2009 IEEE 6th International Power Electronics and Motion Control Conference, May 17-20, 2009, 7 pages.
Ye, Z. et al., "Bidirectional DC/DC converter topology comparison and design," Texas Instruments, High Voltage Power Solutions, Sep. 2016, 15 pages.
Texas Instruments, "LM5170-Q1 Multiphase Bidirectional Current Controller," SNVSAQ6D, Aug. 2021, 72 pages.
Repecho, Victor et al., "Robust ZAD Sliding Mode Control for an 8-Phase Step-Down Converter," IEEE Transactions on Power Electronics. vol. 35. No. 2. Feb. 2019, 11 pages.
Texas Instruments, "LM5170-Q1 Multiphase Bidirectional Current Controller," SNVSAQG, Nov. 2016, 67 pages.
Wani, Rajatkumar et al., "Modeling and Simulation of Average Current-Mode Controlled Bidirectional Multiphase DC-DC Converters used in Hybrid Vehicles," 2021 6th International Conference for Convergence in Technology (I2CT), Pune, India. Apr. 2-4, 2021, 7 pages.
Extended European Search Report, EP Application No. 23305969.0-1202, mailed Dec. 1, 2023, 14 pages.

\* cited by examiner

PRIOR ART

BIDIRECTIONAL DC/DC CONVERTER

TECHNICAL FIELD

The present disclosure relates generally to an electronic system and method, and, in particular embodiments, to a bidirectional dc/dc converter.

BACKGROUND

A traditional car system includes an alternator for charging the 12 V battery. Hybrid electric vehicles (HEVs), such as mild hybrid cars, and electric vehicles (EVs) include a 48 V battery plus a started/generator which are complementary to the traditional 12 V electric network that supplies most of the on-board car systems, such as lighting. HEVs and EVs may not include an alternator for charging the 12 V battery. Thus, the 12 V battery may be charged with power from the 48 V battery.

Bidirectional DC/DC converters may be used to exchange power between the 48 V battery and the 12 V battery. For example, FIG. 1 shows a schematic diagram of exemplary vehicle system 100. Exemplary vehicle system 100 may be, e.g., part of a HEV or EV.

When power flows from 48 V battery 104 to 12 V battery 106, bidirectional DC/DC converter 102 operates in buck mode. For example, when the vehicle is being driven, 48 V battery 104 may receive power from power generator 108, and provide power to 12 V battery 106 to charge 12 V battery 106.

When power flows from 12 V battery 106 to 48 V battery 104, bidirectional DC/DC converter 102 operates in boost mode. For example, 12 V battery 106 may provide power to 48 V battery 104 to assist during startup of the vehicle.

SUMMARY

In accordance with an embodiment, a phase circuit includes: a bidirectional output stage configured to be coupled between a first battery and a second battery; a memory configured to store a number of active phases, and an identifier; and a synchronization circuit configured to receive a first clock signal and determine a start time of a switching cycle of the bidirectional output stage based on the number of active phases, the identifier, and the first clock signal, where the phase circuit is configured to control the timing of the switching of the bidirectional output stage based on the start time.

In accordance with an embodiment, a method for operating a bidirectional multi-phase DC/DC converter including N phase circuits includes: providing a first clock signal to the N phase circuits, where N is a positive integer greater than 1, where M of the N phase circuits are active phase circuits, and where each of the N phase circuits includes a bidirectional output stage coupled between a first battery and a second battery, and a memory storing a number M of active phase circuits of the N phase circuits, and a unique identifier; determining, for each of the M active phase circuits, a respective start time of a switching cycle of the respective bidirectional output stage based on the number M, the unique identifier, and the first clock signal; and operating each of the M active phase circuits with respective switching cycles based on the respective start times to generate respective output currents with the respective bidirectional output stages of the M active phase circuits.

In accordance with an embodiment, a bidirectional multi-phase DC/DC converter includes: N phase circuits, N being a positive integer greater than 1, where each of the N phase circuits includes: a bidirectional output stages configured to be coupled between a first battery and a second battery, a memory configured to store a number of active phases, and a unique identifier, a slave communication interface, and a synchronization circuit; and a processor including: a master communication interface coupled to the slave communication interface of each of the N phase circuits, and a timer configured to provide a first clock signal to each of the N phase circuits, where the synchronization circuit of each of the N phase circuits is configured to determine a respective start time of a switching cycle of the respective bidirectional output stage based on the number of active phases, the respective unique identifier, and the first clock signal, where each of the N phase circuits is configured to control the timing of the switching of the respective bidirectional output stage based on the respective start time.

In accordance with an embodiment, a bidirectional DC/DC converter includes: a phase circuit including: a bidirectional output stage configured to be coupled between a first battery and a second battery, a memory configured to store a number of active phases, and a unique identifier, where the number of active phases is a positive integer greater than or equal to 1, a slave communication interface, and a synchronization circuit, and a processor including: a master communication interface coupled to the slave communication interface, and a timer configured to provide a first clock signal to the phase circuit, where the synchronization circuit is configured to determine a respective start time of a switching cycle of the bidirectional output stage based on the number of active phases, the unique identifier, and the first clock signal, where the phase circuit is configured to control the timing of the switching of the bidirectional output stage based on the start time.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., a multi-phase bidirectional DC/DC converter, e.g., for 48 V/12 V automotive dual-bus system. Some embodiments may be used for other type of applications, such as local energy storage (LES) systems, and/or for other voltage levels. Some embodiments may be used in single-phase bidirectional DC/DC converters.

In an embodiment of the present invention, a multi-phase bidirectional DC/DC converter includes autonomous phase circuits with dynamic and programmable phase management and dual voltage and current regulation capability. In some embodiments, programmable phase management advantageously allows for dynamically enabling and disabling the number of active phases of the converter (e.g., as the load current increases or reduces), which may advantageously allow the converter to operate with optimum efficiency. In some embodiments, programmable phase management advantageously allows for uniformly distributing the workload among the various phases of the converter, which may advantageously optimize the endurance and reliability of the converter.

Figure 1:
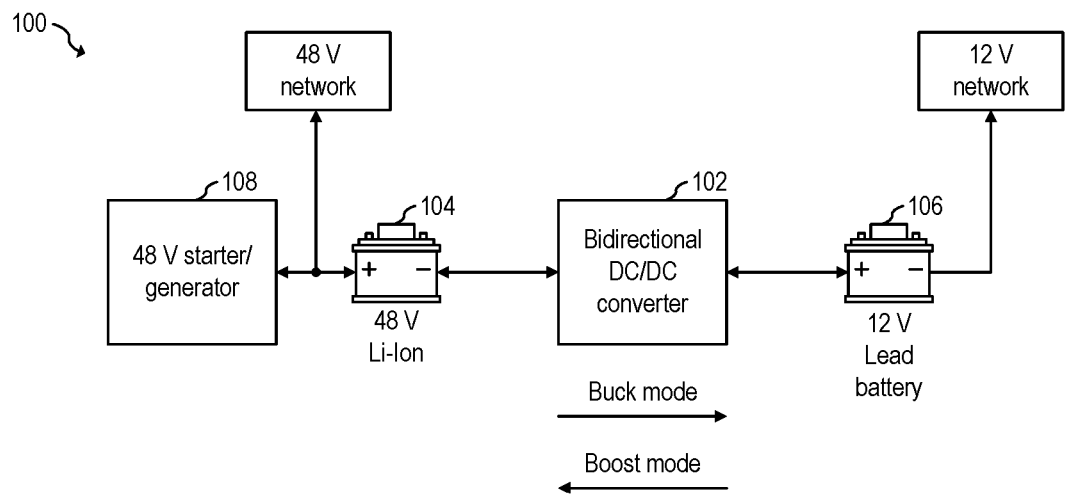
FIG. 1 shows a schematic diagram of an exemplary vehicle system.
Figure 2:
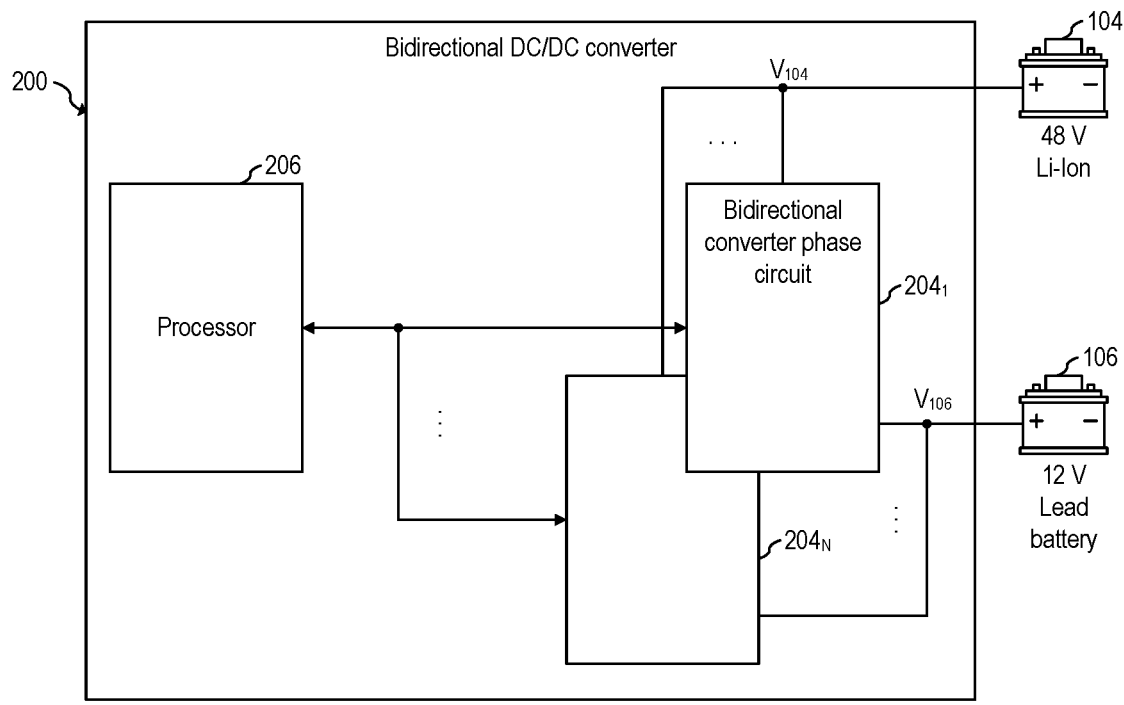
FIG. 2 shows a schematic diagram of a bidirectional multi-phase DC/DC converter, according to an embodiment of the present invention.

FIG. 2 shows a schematic diagram of bidirectional multi-phase DC/DC converter 200, according to an embodiment of the present invention. Converter 200 includes processor 206 and N (e.g., identical) bidirectional converter phase circuits 204. In some embodiments, converter 200 may be implemented to replace converter 102 in system 100.

In some embodiments, the number of physical phase circuits N is equal to 6. In some embodiments, N may be lower than 6, such as 5, 4, or lower. In some embodiments, N is higher than 6, such as 7, 8, or higher.

As will be described in more detail below, in some embodiments, the number M of active phase circuits 204 (phase circuits actively switching) may be equal to or lower than N. In some embodiments, M may be as low as 1 during normal operation. As will be described in more detail below, in some embodiments, the number M of active phase circuits 204 may be dynamically adjusted to operate, e.g., at an optimum output current and/or to optimize ripple.

Converter 200 may operate in buck mode to transfer power from battery 104 to battery 106 via the M active phase circuits 204, or in boost mode to transfer power from battery 106 to battery 104 via the M active phase circuits 204.

As will be described in more detail below, in some embodiments, processor 206 provides information to each phase circuit 204 and a driving (e.g., PWM) clock signal to each phase circuit 204 to allow for synchronized operation of each active phase circuit, e.g., at an optimum level, e.g., while balancing the workload among the N phase circuits during their lifetime (e.g., to optimize the endurance and reliability of converter 200).

As will be described in more detail below, in some embodiments, each of phase circuits 204 autonomously (independently from other phase circuits 204) determines the phase shift with respect to other active phase circuits 204 to synchronously operate to deliver power from battery 104 to 106 (in buck mode) or from battery 106 to 104 (in boost mode). As will be described in more detail below, in some embodiments, the determination of which phase circuit 204 is active, which phase circuit 204 is disabled, and which phase shift to use by each phase circuit 204, is determined autonomously by each phase circuit 204 (e.g., based on information received from processor 206).

In some embodiments, converter 200 operates as a current regulator (either in boost mode or in buck mode) based on the output ($S_{326}$) of current sensor 326. Operating as a current regulator may be advantageous when exchanging power between batteries.

In some embodiments, the current flowing from/to battery 104 to/from battery 106 is programmable. As will be described in more detail below, in some embodiments, each of phase circuits 204 autonomously measures and controls the current flow from/to battery 104 to/from battery 106 (e.g., based on information received from processor 206). In some embodiments, the magnitude of current flowing through each phase circuit 204 may be, e.g., up to 50 A. In some embodiments, each phase circuit 204 may be capable of delivering currents higher than 50 A, such as 55 A, 60 A, or higher. In some embodiments, the maximum current capability of each phase circuit 204 may be lower than 50 A, such as 45 A, 40 A, or lower.

As will be described in more detail below, in some embodiments, each of phase circuits 204 autonomously reduces the regulated current with respect to a target current if such target current would have caused the voltage applied to the battery (e.g., 106 if in buck mode or 104 if in boost mode) to exceed a predetermined voltage threshold. In some such embodiments, upon exceeding the predetermined voltage threshold, the phase circuits 204 may operate in voltage regulation mode.

In some embodiments, processor 206 may program the phase circuits 204 and may provide a driving (e.g., PWM) signal to the phase circuits 204. In some embodiments, processor 206 may provide additional signals to phase circuits 204. In some embodiments, processor 206 may perform additional functions not related to converter 200, such as additional functions related to system 100.

In some embodiments, processor 206 may be implemented as a generic or custom processor or microcontroller coupled to a (e.g., internal or external) memory and configured to execute instructions stored in such memory.

Figure 3:
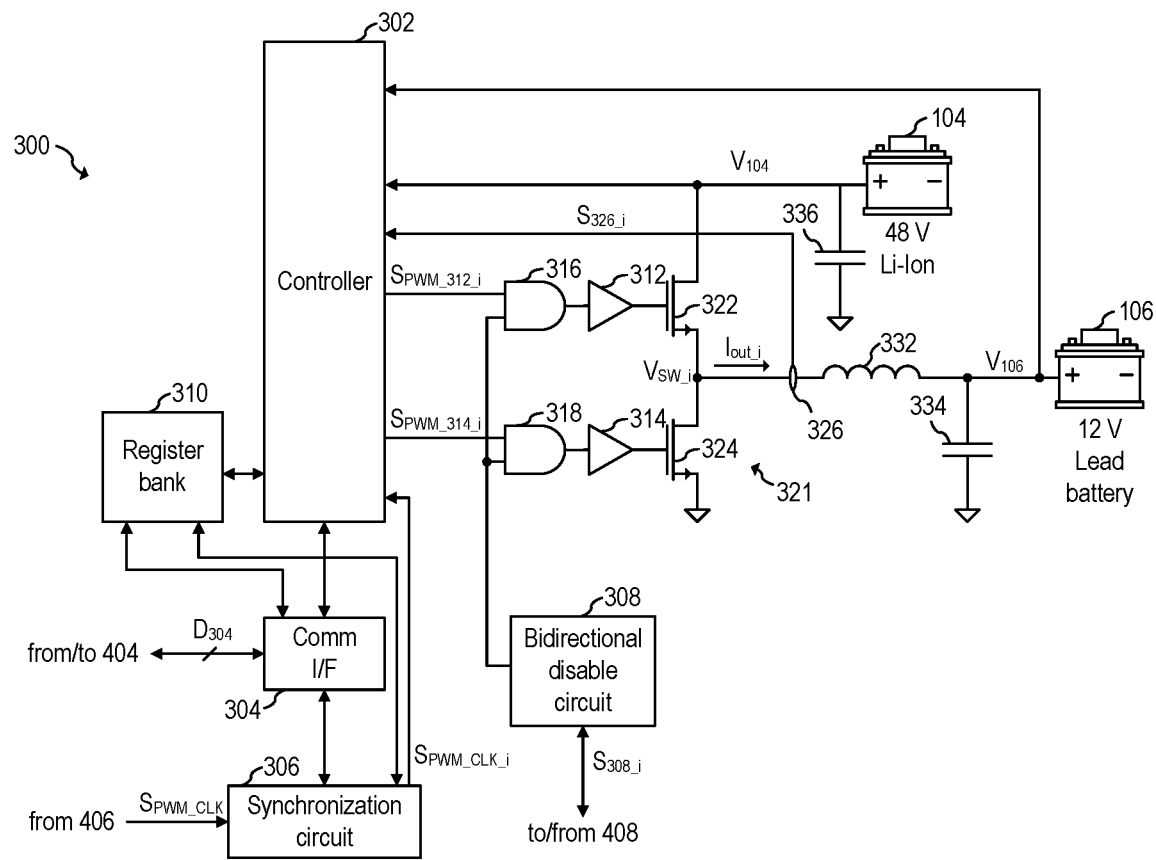
FIG. 3 shows a schematic diagram of a bidirectional converter phase circuits, according to an embodiment of the present invention.

FIG. 3 shows a schematic diagram of bidirectional converter phase circuit 300, according to an embodiment of the present invention. In FIG. 3, subscript "i" represents a number from 1 to N, N being the number of physical phase circuits implemented by a bidirectional multi-phase DC/DC converter, such as 200, i being indicative of a phase circuit of the N phase circuits. Thus, in the embodiment of FIG. 3, signals $S_{PWM\_312\_i}$, $S_{PWM\_314\_i}$, $S_{PWM\_CLK\_i}$, $V_{SW\_i}$, $I_{out\_i}$ and $S_{308\_i}$ are signals associated with the particular phase circuit $300_i$ while signals $V_{104}$, $V_{106}$, $D_{304}$ and $S_{PWM\_CLK}$ are global signals shared among all N phase circuits 300.

Each phase circuit 300 includes controller 302, communication interface 304, synchronization circuit 306, bidirectional disable circuit 308, gate drivers 312 and 314, AND gates 316 and 318, output transistors 322 and 324, current sensor 326, inductor 332 and capacitors 334 and 336. In some embodiments, capacitors 334 and 336 are global capacitors shared among all N phase circuits 300.

Each of bidirectional converter phase circuits 204 may be implemented as bidirectional converter phase circuit 300.

Figure 4:
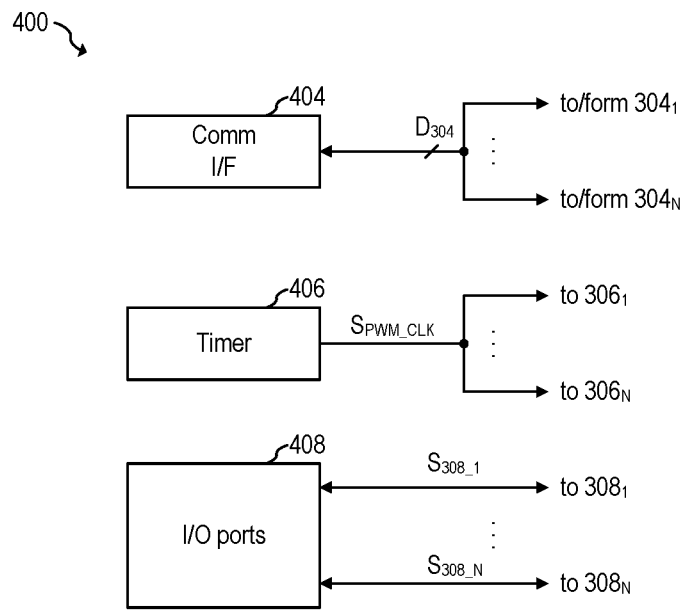
FIG. 4 shows a schematic diagram of a processor, according to an embodiment of the present invention.

FIG. 4 shows a schematic diagram of processor 400, according to an embodiment of the present invention. Processor 400 includes communication interface 404, timer 406, and input/output (I/O) ports 408. Processor 206 may be implemented as processor 400.

FIGS. 3 and 4 may be understood together.

In some embodiments, controller 302 is configured to operate gate drivers 312 and 314 according to signal $S_{PWM\_CLK\_i}$.

During buck mode, controller 302 operates gate drivers 312 and 314 (with signals $S_{PWM312}$ and $S_{PWM314}$, respectively) in a conventional manner so that, during a buck charge phase, transistor 322 is on and transistor 324 is off to cause current to flow from battery 104 to battery 106 via inductor 332 and to energize inductor 332 (e.g., slightly increasing its current above the set point value), and during a buck discharge phase, transistor 322 is off and transistor 324 is on to cause inductor 332 to de-energize (e.g., slightly reducing its current below the set point value), while still charging current to battery 106.

During boost mode, controller 302 operates gate drivers 312 and 314 in a conventional manner so that, during a boost charge phase, transistor 324 is on and transistor 322 is off to cause current to flow from battery 106 to ground via inductor 332 to energize inductor 332 (e.g., slightly increasing its current above the set point value), and during a boost discharge phase, transistor 324 is off and transistor 322 is on to cause inductor 332 to de-energize (e.g., slightly reducing its current below the set point value) while charging current to battery 104.

In some embodiments, during buck mode, controller 302 regulates current $I_{out\_i}$ to a target (positive) current so long as voltage $V_{106}$ does not exceed a predetermined threshold (e.g., 14 V). If voltage $V_{106}$ exceeds the predetermined threshold (e.g., when battery 106 is defective), controller 302 transitions to voltage regulation mode.

In some embodiments, during boost mode, controller 302 regulates current $I_{out\_i}$ to a target (negative) current so long as voltage $V_{104}$ does not exceed a predetermined threshold (e.g., 50 V). If voltage $V_{104}$ exceeds the predetermined threshold (e.g., when battery 104 is defective), controller 302 transitions to voltage regulation mode.

In some embodiments, controller 302 generates signals $S_{PWM\_312\_i}$ and $S_{PWM\_314\_i}$ with appropriate duty cycles based on the target current and clock $S_{PWM\_CLK\_i}$.

In some embodiments, the target current, the predetermined threshold voltage for $V_{104}$ and the predetermined threshold voltage for $V_{106}$ may be programmable, e.g., via (e.g., slave) communication interface 304, e.g., by 400. In some embodiments, information about the target current is delivered based on the duty cycle of signal $S_{PWM\_CLK}$ (where the duty cycle of signal $S_{PWM\_CLK}$ is indicative of the target current).

In some embodiments, bidirectional disable circuit 308 is configured to disable the switching of transistors 322 and 324 (e.g., by providing a low signal to AND gates 316 and 318), e.g., in response to a signal from processor 400 (e.g., by asserting fault signal $S_{308\_i}$ by I/O ports 408) and/or in response to a fault condition, such as an over voltage, under voltage, or oscillator failure. In some embodiments, phase circuit 300 may not implement bidirectional disable circuit 308.

In some embodiments, controller 302 may be implemented with digital circuits, and may include a finite state machine (FSM). In some embodiments, controller 302 may be implemented with a generic or custom processor or controller.

As shown in FIG. 3, controller 302 receives signals $V_{104}$ (indicative of the voltage of battery 104), $V_{116}$ (indicative of the voltage of battery 106), and $S_{326\_i}$ (indicative of the current $I_{out\_i}$). In some embodiments, controller 302 includes an analog-to-digital converter (ADC) subsystem (which may include one or more ADCs) to convert signals $V_{104}$, $V_{106}$ and $S_{326\_i}$ to digital data to be processed by controller 302. In some embodiments, the ADC subsystem may be implemented external to controller 302.

In some embodiments, communication interface 304 is configured to receive (and transmit) $D_{304}$ from (to) (e.g., master) communication interface 404. In some embodiments, communication interfaces 304 and 404 are implemented according to a serial peripheral interface (SPI) protocol. In some embodiments, communication interfaces 304 and 404 may be implemented according to other communication protocols such as inter-integrated circuit (I2C), for example.

In some embodiments, gate drivers 312 and 314 may be implemented in any way known in the art.

In some embodiments, I/O ports 408 include a plurality of (e.g., general purpose) I/O ports for providing and/or receiving a signal $S_{308\_i}$. I/O ports 408 may be implemented in any way known in the art.

In some embodiments, synchronization circuit 306 is configured to receive PWM clock signal $S_{PWM\_CLK}$ and generate PWM clock signal $S_{PWM\_CLK\_i}$ based on PWM clock signal $S_{PWM\_CLK}$, where signal $S_{PWM\_CLK\_i}$ is a phase shifted version (delayed start version) of signal $S_{PWM\_CLK}$, where the phase shift may be from 0° to 360° and may be determined based on the number of active phases of a bidirectional multi-phase DC/DC converter that includes phase circuit 300 and based on an identifier $M_i$ of the phase circuit 300. For example, in some embodiments, the phase shift exhibited by signal $S_{PWM\_CLK\_i}$ with respect to signal $S_{PWM\_CLK}$ for phase circuit $M_i$ may be given by $$\frac{M_i - 1}{M} \cdot 360°, \text{ if } 1 \leq M_i \leq M \tag{1}$$

Thus, in some embodiments, if M is equal to 2 (2 active phases), a first phase $M_i$ may have a phase shift of 0° and a second phase M2 may have a phase shift of 180°. As another example, in an embodiment with M=6, each of the Mi active phases may be spaced 60° apart in accordance with Equation 1. Thus, in some embodiments, a single PWM clock signal $S_{PWM\_CLK}$ may be used to synchronize operation of a multiphase converter having M active phase circuits 300, thereby advantageously reducing the complexity of processor 400 (which may not have to provide M separate PWM signals).

Although FIG. 3 shows synchronization circuit 306 providing PWM clock signal $S_{PWM\_CLK\_i}$ to controller 302, in some embodiments, synchronization circuit 306 provides a PWM signal (e.g., delayed as per Equation 1) to drive gate drivers 312 and 314 based on clock $S_{PWM\_CLK}$ and based on an on-time $T_{ON}$ (e.g., provided by controller 302).

In some embodiments, controller 302 includes synchronization circuit 306.

As will be described in more detail later, in some embodiments, for phase circuits 300 having an identifier $M_i$ greater than or equal to M, the signal $S_{PWM\_CLK\_i}$ of such circuits may be kept low so as to keep such phase circuit 300 inactive (not switching).

In some embodiments, values M, and $M_i$ may be programmable, e.g., via communication interface 304, e.g., by 400.

In some embodiments, timer circuit 406 is configured to generate PWM signal $S_{PWM\_CLK}$. In some embodiments, timer circuit 406 may be implemented in way known in the art.

In some embodiments, current sensor 326 may be implemented in any way known in the art.

As shown in FIG. 3, output stage 321 is implemented as a half-bridge (with high-side transistor 322 and low-side transistor 324). Other implementations are also possible. For example, in some embodiments, output stage may be implemented with a full-bridge.

In some embodiments, phase circuit 300 includes a register bank 310 for storing fixed or programmable values to configured phase circuit 300. For example, in some embodiments, register bank 310 is configured to store the target current, predetermined threshold voltages for $V_{104}$ and $V_{106}$, N, M, and/or $M_i$ values.

Figure 5:
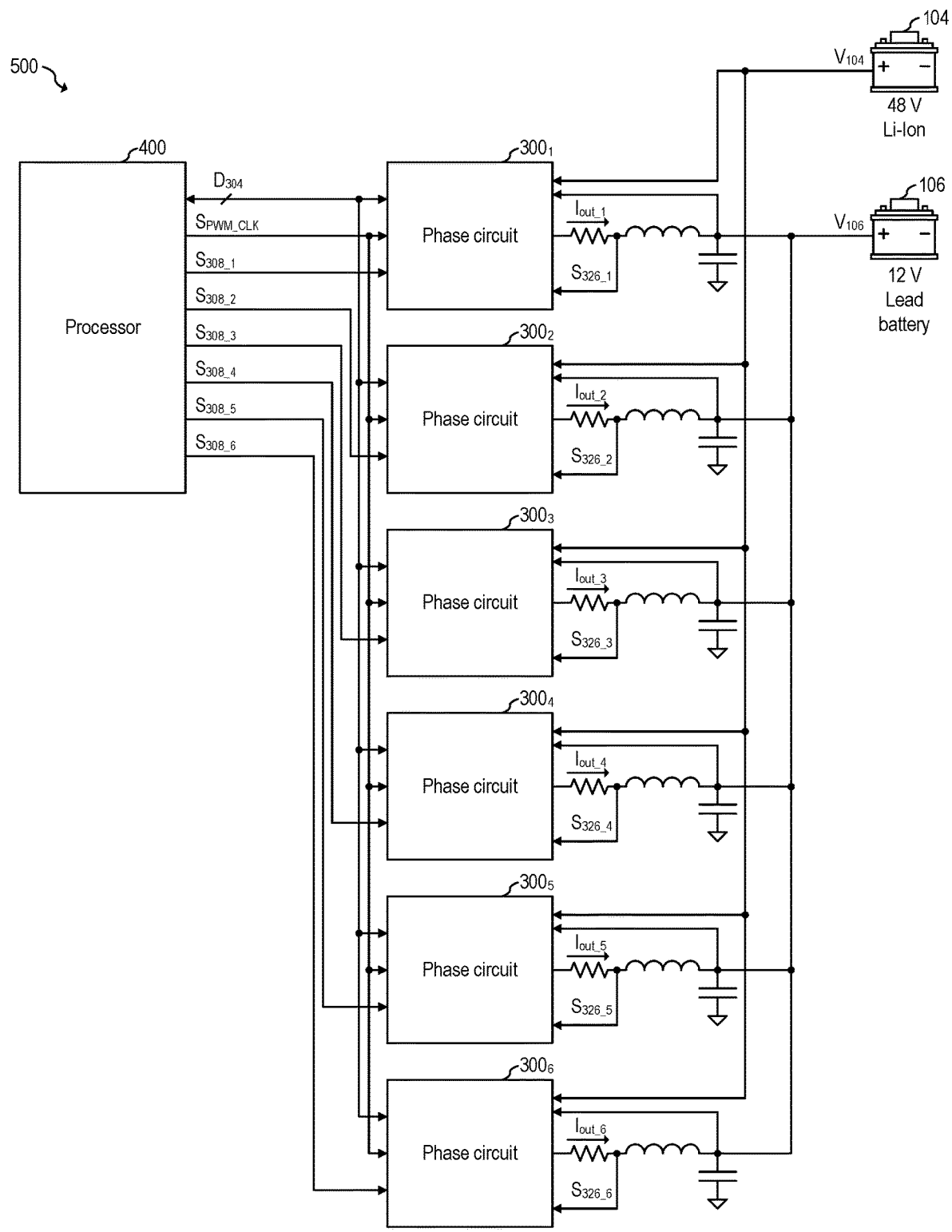
FIG. 5 shows a schematic diagram of a bidirectional multi-phase DC/DC converter, according to an embodiment of the present invention.

In some embodiments, portions of phase circuit 300 may be integrated in a monolithic or multi-die integrated circuit (IC). For example, FIG. 5 shows a schematic diagram of bidirectional multi-phase DC/DC converter 500, according to an embodiment of the present invention. Converter 500 includes a plurality (e.g., N=6) of phase circuits 300 (each integrated in a respective IC) and processor 400 (integrated in an IC). In the embodiment shown in FIG. 5, each of current sensors 326 is implemented with a shunt resistor. Bidirectional multi-phase DC/DC converter 200 may be implemented as bidirectional multi-phase DC/DC converter 500.

As shown in FIG. 5, in some embodiments, each phase circuit 300 may be implemented in a respective (e.g., multi-die) IC, where each IC may include elements 302, 304, 306, 308, 312, 314, 316, 318, 322 and 324, with elements 332 and 334 being external to the IC, and with at least a portion of element 326 being external to the IC. Other implementations are also possible. For example, in some embodiments, transistors 322 and 324 may be implemented external to the IC.

In some embodiments, converter 500 may be integrated in other ways. For example, in some embodiments, all N phases (e.g., 6) of converter 500 may be integrated in a single IC, with each phase circuit having its own circuits 302, 306, 308, 312, 314, 316, 318, 322, 324, but with a common single communication interface 304. Other implementations are also possible.

Figure 6:
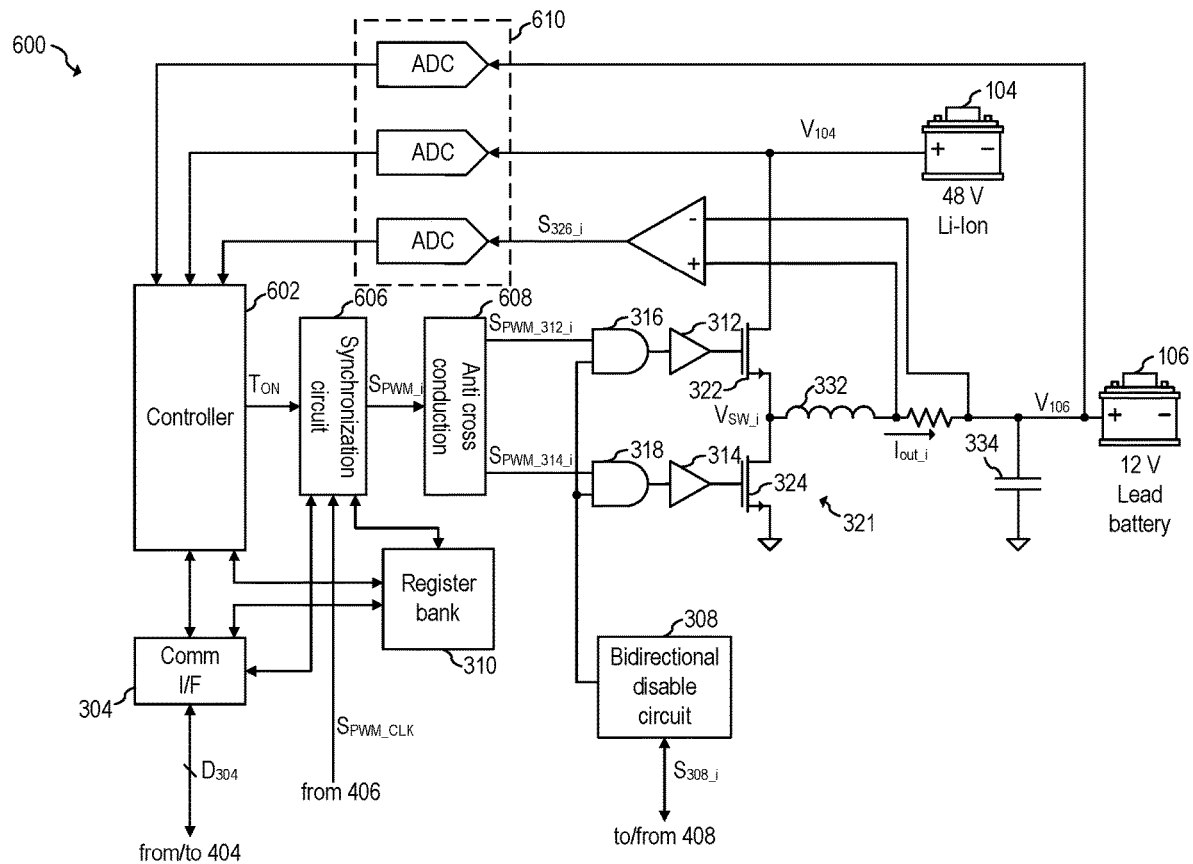
FIG. 6 shows a schematic diagram of a bidirectional converter phase circuit, according to an embodiment of the present invention.

FIG. 6 shows a schematic diagram of bidirectional converter phase circuit 600, according to an embodiment of the present invention. Bidirectional converter phase circuit 204 may be implemented as bidirectional converter phase circuit 600.

Phase converter 600 operates in a similar manner as phase converter 300. Phase converter 600, however, generates PWM signal $S_{PWM}$ (for generating signals $S_{PWM\_312\_i}$ and $S_{PWM\_314\_i}$ by synchronization circuit 606. Converter 500 may be implemented with phase circuits 600.

In some embodiments, synchronization circuit 606 may be implemented by controller 602.

In some embodiments, synchronization circuit 606 generates signal $S_{PWM\_i}$ with a delay based on clock signal $S_{PWM\_CLK}$ and on an internal (e.g., programmable) identifier $M_i$, and a duty cycle based on on-time value $T_{ON}$ (provided by controller 602).

In some embodiments, ADC subsystem 610 is used to sense signals $V_{104}$, $V_{106}$, and $S_{326\_i}$. As shown in FIG. 6, ADC subsystem 610 may include 3 ADCs. In some embodiments, less than 3 ADCs may be used. For example, during buck mode, some embodiments monitor signals $S_{326\_i}$ (e.g., for current regulation) and $V_{106}$ (e.g., for over-voltage protection and/or voltage regulation) but do not monitor signal $V_{104}$. During boost mode, some embodiments monitor signals $S_{326\_i}$ (e.g., for current regulation) and $V_{104}$ (e.g., for over-voltage protection and/or voltage regulation) but do not monitor signal $V_{106}$. In some such embodiments, ADC subsystem 610 may include only 2 ADCs (e.g., 1 for measuring signal $S_{326\_i}$ and another one for measuring signal $V_{104}$ during boost mode, and signal $V_{106}$ during buck mode). Other implementations are also possible.

In some embodiments, anti-cross-conduction circuit 608 is configured to prevent, in a conventional manner, both transistors 322 and 324 to be on at the same time.

Figure 7:
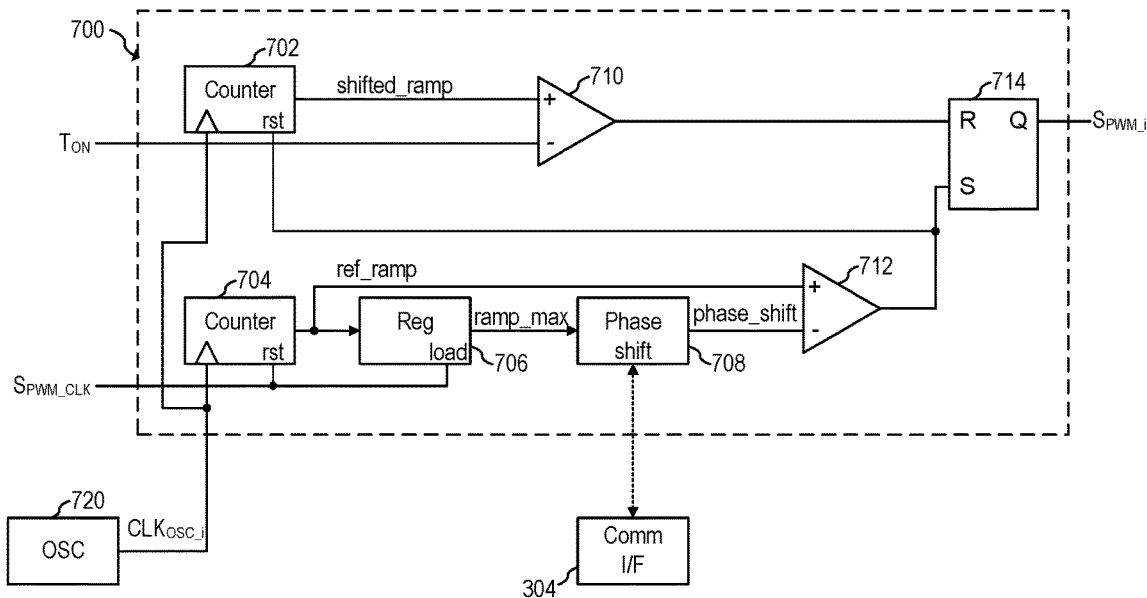
FIG. 7 shows a schematic diagram of a synchronization circuit, according to an embodiment of the present invention.

FIG. 7 shows a schematic diagram of synchronization circuit 700, according to an embodiment of the present invention. Synchronization circuit 700 includes counters 702 and 704, register 706, phase shift circuit 708, comparators 710 and 712, and SR flip-flop 714. In some embodiments, local oscillator 720 may be implemented outside synchronization circuit 700 (e.g., but in the same IC as the IC that includes the phase circuit containing synchronization circuit 700). Synchronization circuit 606 may be implemented as synchronization circuit 700.

In some embodiments, synchronization circuit 700 is implemented using (e.g., solely) digital circuits. In such embodiments, signals $T_{ON}$, shifted_ramp, ref_ramp, ramp_max and phase_shift are digital signals.

Figure 8:
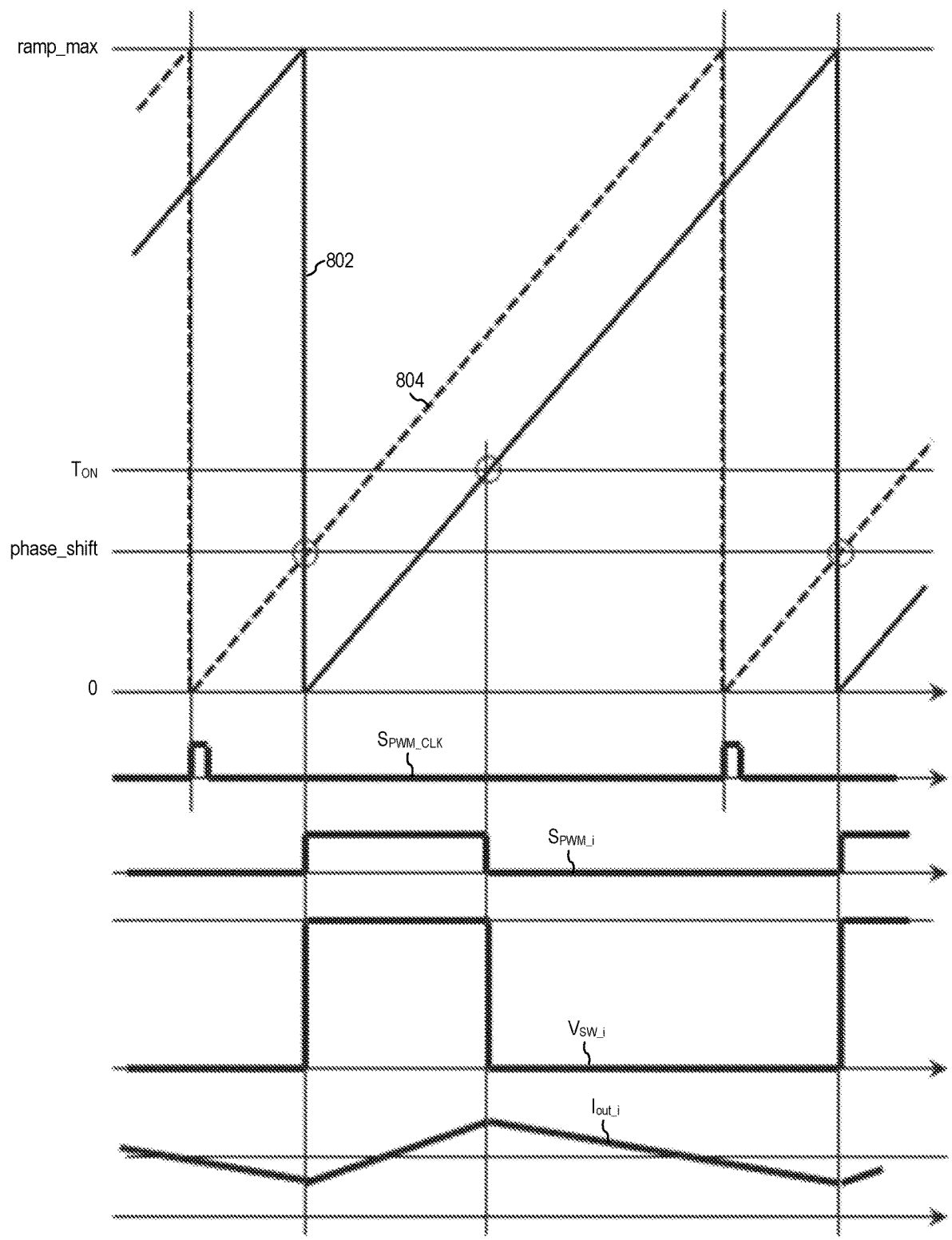
FIG. 8 shows waveforms associated with the synchronization circuit of FIG. 7, according to an embodiment of the present invention.

FIG. 8 shows waveforms associated with synchronization circuit 700, according to an embodiment of the present invention. FIGS. 7 and 8 may be understood together.

The description that follows assumes buck mode operation. However, the description similarly applies to boost mode, e.g., by reversing the direction (sign) of current $I_{out\_i}$.

During normal operation, counter 704 receives clock $CLK_{OSC\_i}$ from local oscillator 720 and produces reference ramp ref_ramp (as shown by curve 804). Signal $S_{PWM\_CLK}$ is provided to the reset input of counter 704 and to the load input of register 706. Each time signal $S_{PWM\_CLK}$ is asserted (e.g., transitions from low to high, as shown in FIG. 8), counter 704 is restarted (reference ramp ref_ramp transitions from ramp_max to o), and the last value (ramp_max) of reference ramp ref_ramp before counter 704 is restarted is loaded into register 706. Counter 704 then counts up until the next assertion of signal $S_{PWM\_CLK}$.

In some embodiments, phase shift circuit 708 generates the value phase_shift by $$\text{phase\_shift} = \frac{M_i - 1}{M} \cdot \text{ramp\_max}, \text{ if } 1 \le M_i \le M \quad (2)$$

As can be seen, Equations 1 and 2 are equivalent, where ramp_max represents the 360°.

When reference ramp ref_ramp reaches the phase_shift value, comparator 712 is asserted, thereby causing the setting of flip-flop 714 (which causes the assertion of signal $S_{PWM\_i}$) and the resetting of counter 702. As shown in FIGS. 7 and 8, counter 702 generates ramp shifted_ramp (illustrated by curve 802), which is a delayed version of ramp ref_ramp, where the delay is based on the output of phase shift circuit 708.

When the ramp shifted_ramp reaches value $T_{ON}$, comparator 710 is asserted thereby resetting flip-flop 714 (and thus controlling the duty cycle of signal $S_{PWM\_i}$).

As illustrated in FIG. 8, in view of FIG. 6, the assertion and deassertion of signal $S_{PWM\_i}$ causes voltage $V_{SW\_i}$ to asserted and deassert, thereby causing current $I_{out\_i}$ to increase or decrease accordingly.

As can be seen from FIGS. 7 and 8, in cases were signals $CLK_{OSC\_i}$ are all equal to each other (for all i), and where signals $CLK_{OSC\_i}$ and $S_{PWM\_CLK}$ experience no jitter and no frequency variation, the ramp_max value may remain constant cycle-to-cycle of signal $S_{PWM\_CLK}$ (and be the same for each circuit 700 for all i). In cases were signals $CLK_{OSC\_i}$ and $S_{PWM\_CLK}$ experience jitter and/or frequency variations and/or signals $CLK_{OSC\_i}$ is different to other signals $CLK_{OSC}$ (e.g., the frequency of $CLK_{OSC\_i}$ being different from the frequency of $CLK_{OSC\_2}$), the ramp_max value may be different for each circuit 700 and/or may vary (e.g., slightly) cycle-to-cycle of signal $S_{PWM\_CLK}$. In some such embodiments, since shifted ramp has a peak value based on the ramp_max value of the previous cycle of signal $S_{PWM\_CLK}$ (for the particular signal $CLK_{OSC\_i}$), synchronization circuit 700 is advantageously capable of producing signals $S_{PWM\_i}$ (for each circuit 700 of the converter) that remain synchronized with other signals $S_{PWM\_i}$ (produced by synchronization circuits 700 of other phase circuits of the converter) even in the presence of jitter and/or frequency variations of signals $CLK_{OSC\_i}$ and $S_{PWM\_CLK}$ and/or different frequencies for one or more of signals $CLK_{OSC}$. Thus, some embodiments are advantageously capable of maintaining a target on-time (e.g., as reflected by the $T_{ON}$ value) of signal $S_{PWM\_i}$ (e.g., produced by each synchronization circuit 700 of the converter) even in the presence of jitter and/or frequency variations of signals $CLK_{OSC\_i}$ and $S_{PWM\_CLK}$.

Figure 9:
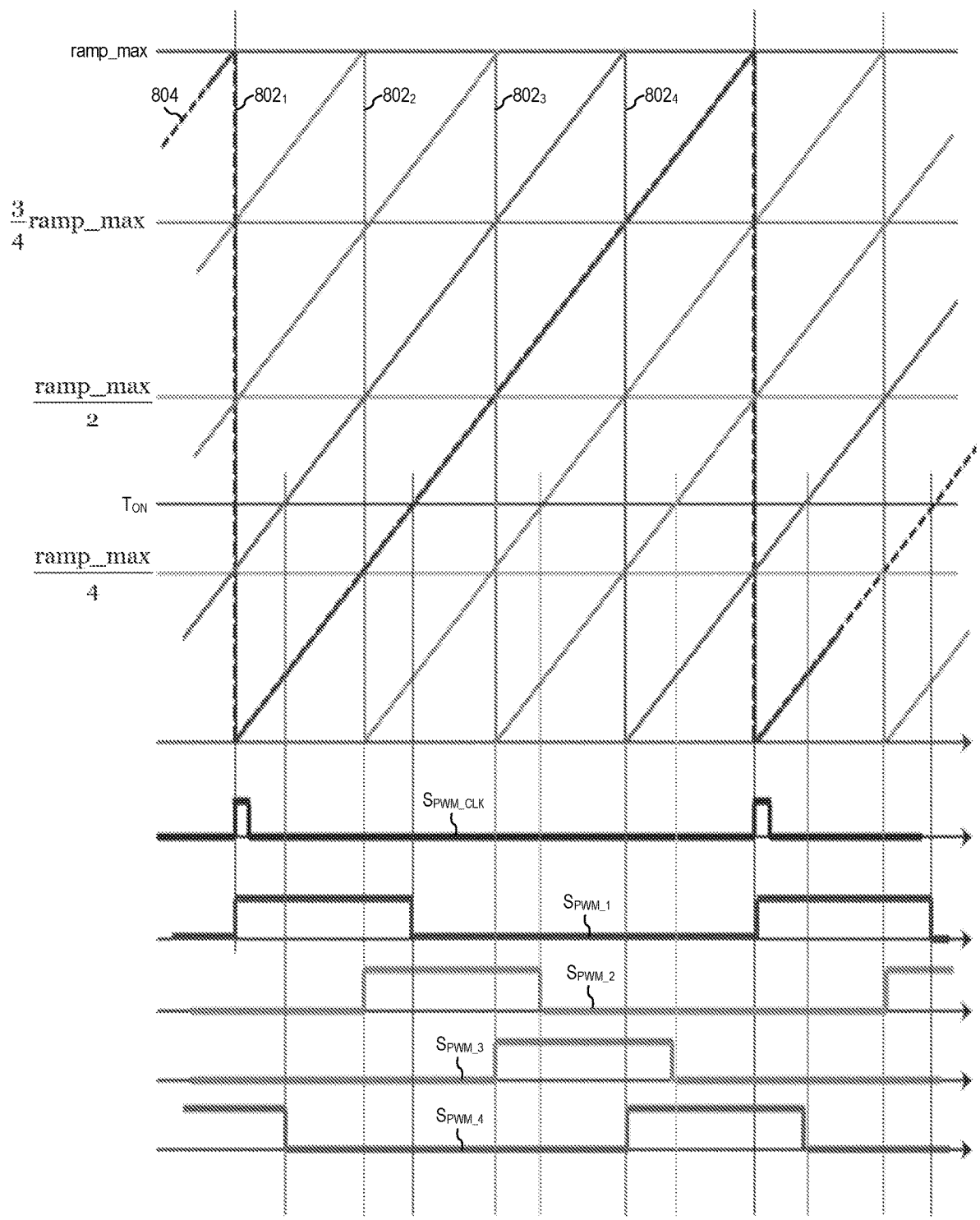
FIG. 9 shows waveforms associated with the bidirectional multi-phase DC/DC converter of FIG. 5 implemented with synchronization circuits of FIG. 7, according to an embodiment of the present invention.

FIG. 9 shows waveforms associated with bidirectional multi-phase DC/DC converter 500, implemented with 6 (N=6) synchronization circuits 700 (700₁, 700₂, 700₃, 700₄, 700₅, and 700₆), 4 of which being active and 2 of which being inactive, according to an embodiment of the present invention. FIG. 9 may be understood in view of FIGS. 5-8.

FIG. 9 represents a simulation assuming no jitter or frequency variations of signals $S_{PWM\_CLK}$ and $CLK_{OSC\_i}$, and assuming that phases 1-4 are active and phases 5 and 6 are inactive. Since there are only 4 active phases, M=4. In the embodiment illustrated in FIG. 9, $M_1=1$, $M_2=2$, $M_3=3$, $M_4=4$, $M_5=5$, and $M_6=6$, where $M_1$, $M_2$, $M_3$, $M_4$, $M_5$, and $M_6$, correspond to circuits 700₁, 700₂, 700₃, 700₄, 700₅, and 700₆, respectively.

As shown in FIG. 9, only one curve 804 is illustrated (since curves 804 for each of circuits 700 is the identical given that the simulation assumes identical signals $CLK_{OSC}$ for each of circuits 700). As illustrated by curves 802₁, 802₂, 802₃, and 802₄, the shifted ramp shifted_ramp is delayed according to Equation 2 (depending on the particular $M_i$ value of the particular circuit 700). For example, as shown in FIG. 9 (and based on Equation 2), the start time for shifted ramps shifted_ramp for circuit 700₁ (802₁) occurs with 0 delay (when ref_ramp=ramp_max), the start time for shifted ramps shifted_ramp for circuit 700₂ (802₂) occurs with 90° phase shift delay $$\left(\text{when ref\_ramp} = \frac{\text{ramp\_max}}{4}\right),$$

the start time for shifted ramps shifted_ramp for circuit 700₃ (802₃) occurs with 180° phase shift delay $$\left(\text{when ref\_ramp} = \frac{\text{ramp\_max}}{2}\right),$$

and the start time for shifted ramps shifted_ramp for circuit 700₄ (802₄) occurs with 270° phase shift delay (when ref_ramp=¾ ramp_max).

As also shown in FIG. 9, signals $S_{PWM\_1}$, $S_{PWM\_2}$, $S_{PWM\_3}$, and $S_{PWM\_4}$ are also phase shifted by 90° from each other. Signals $S_{PWM\_5}$, and $S_{PWM\_6}$ (not illustrated in FIG. 9) are not switching, which is in accordance with Equation 2 (since $M_5$>M and $M_6$>M).

In some embodiments, processor 400 determines the number of active phases M of the converter (e.g., 500). For example, in some embodiments, processor 400 determines the number of active phases such that each of the active phases operates with an optimum (e.g., most efficient) target current, e.g., while reducing or minimizing the ripple. For example, if the overall target current for converter 500 is 100 A, and each of the phase circuits operates in an optimum manner when delivering 50 A, then processor 400 may set M=2 such that each of the two active phases operates with a target current of 50 A. Similarly, if the overall target current changes to 300 A, then processor 400 may dynamically update the value of M so that it equals to 6 so that each active phase operates with a target current of 50 A).

In some embodiments, processor 400 programs the value M to each of the circuits 700 (e.g., via communication interface 404). As illustrated by Equation 2, in some embodiments, dynamically updating the value of M to all circuits 700 advantageously automatically enables/disables circuits 700 based on their identifier Mi (since circuits 700 with identifies Mi greater than M are disabled and circuits 700 with identifies Mi lower than or equal to M are enabled).

In some embodiments, processor 400 dynamically updates identifiers $M_i$ for each of circuits 700 (e.g., via communication interface 404). For example, in some embodiments having 6 phases circuits (N=6), at a first time, identifiers $M_1=1$, $M_2=2$, $M_3=3$, $M_4=4$, $M_5=5$, and $M_6=6$, where $M_1$, $M_2$, $M_3$, $M_4$, $M_5$, and $M_6$, correspond to circuits 700₁, 700₂, 700₃, 700₄, 700₅, and 700₆, respectively. At a second time, identifiers $M_1=5$, $M_2=6$, $M_3=1$, $M_4=2$, $M_5=3$, and $M_6=4$. Since, in some embodiments, the value of the identifier $M_i$ determines which phase circuit 700 is active and which phase circuit 700 is disabled, in some embodiments, processor 400 may dynamically update identifiers $M_i$ for each of circuits 700 so that the inactive phase circuits 700 periodically replace the active phase circuits 700 to, e.g., uniformly distribute the workload among the various phase circuits 700 during their lifetime. By uniformly distributing the work load among the various phase circuits 700, some embodiments advantageously optimize the endurance and reliability of the bidirectional converter.

Figure 10:
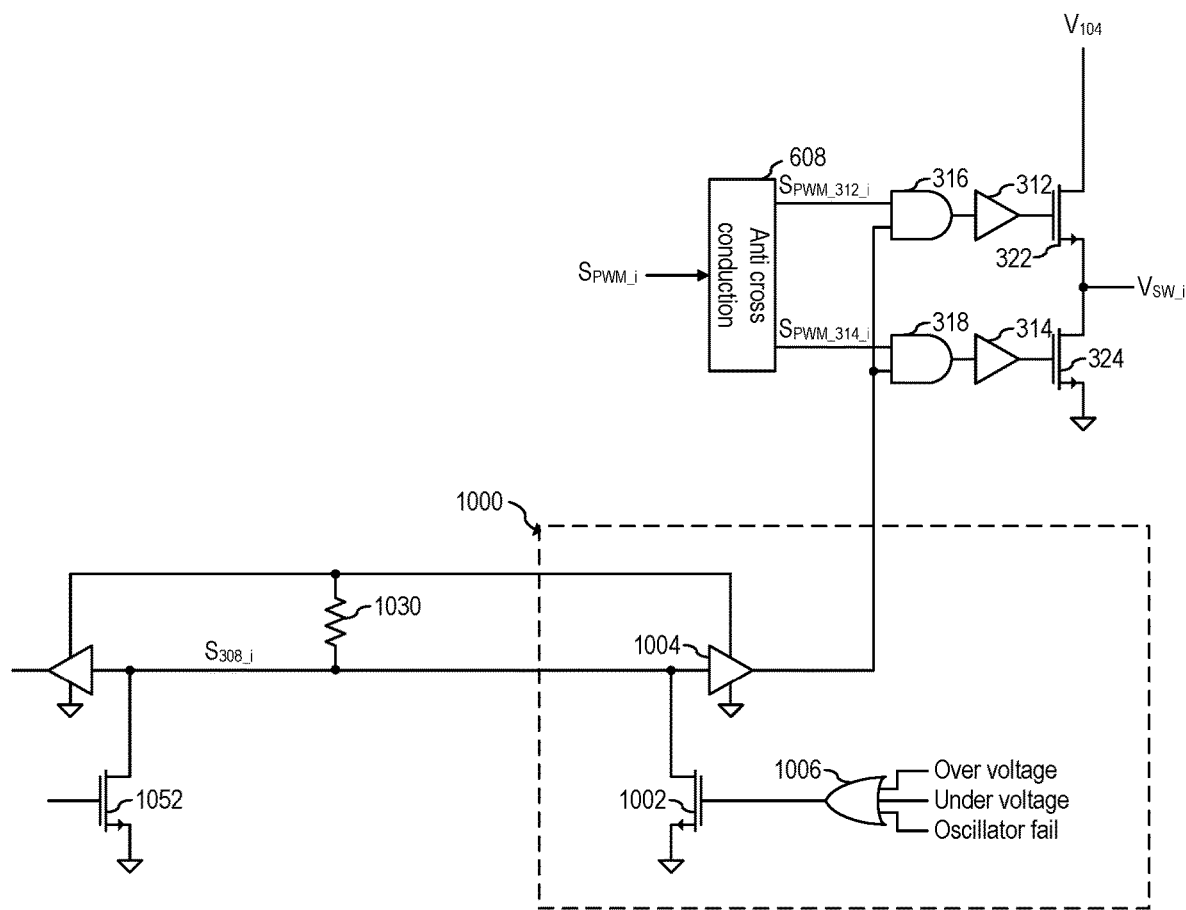
FIG. 10 shows a schematic diagram of a bidirectional disable circuit, according to an embodiment of the present invention.

FIG. 10 shows a schematic diagram of bidirectional disable circuit 1000, according to an embodiment of the present invention. Bidirectional disable circuit 1000 includes buffer 1004, transistor 1002, and OR gate 1006. Bidirectional disable circuit 308 may be implemented as bidirectional disable circuit 1000.

As shown in FIG. 10, transistor 1002 operates in open drain configuration and may be turned on by fault conditions such as over voltage (e.g., of $V_{104}$ and/or $V_{116}$), under voltage (e.g., of $V_{114}$ and/or $V_{106}$), and/or oscillator fail (e.g., of oscillator 720). The turning on of transistor 1002 (e.g., immediately) turns off the switching of transistors 322 and 324 and alerts an external circuit (e.g., processor 400), that a fault condition occurred.

In some embodiments, an external circuit (e.g., processor 400) may cause gate drivers 312 and 314 to (e.g., immediately) turn off the switching of transistors 322 and 324 (e.g., by turning on transistor 1052.

In some embodiments, resistor 1030 may be integrated as part of bidirectional disable circuit 1000.

In some embodiments, bidirectional disable circuit 1000 may be implemented without transistor 1002 and OR gate 1006.

Advantages of some embodiments include operating a multi-phase bidirectional converter without a specific centralized PWM controller, and with optimized efficiency, lifetime and reliability. Additional advantages include flexibility and optimized performance (e.g., due to digital programming).

Example embodiments of the present invention are summarized here. Other embodiments can also be understood from the entirety of the specification and the claims filed herein.

Example 1. A phase circuit including: a bidirectional output stage configured to be coupled between a first battery and a second battery; a memory configured to store a number of active phases, and an identifier; and a synchronization circuit configured to receive a first clock signal and determine a start time of a switching cycle of the bidirectional output stage based on the number of active phases, the identifier, and the first clock signal, where the phase circuit is configured to control the timing of the switching of the bidirectional output stage based on the start time.

Example 2. The phase circuit of example 1, where the phase circuit is configured to disable the bidirectional output stage based on the identifier.

Example 3. The phase circuit of one of examples 1 or 2, where the phase circuit is configured to, when the number of active phases is lower than the identifier, disable the bidirectional output stage.

Example 4. The phase circuit of one of examples 1 to 3, further including a controller configured to regulate an output current of the bidirectional output stage based on a target current.

Example 5. The phase circuit of one of examples 1 to 4, where the synchronization circuit is configured to receive an on-time value from the controller and generate a driving signal based on the on-time value, and the start time, where the switching of the bidirectional output stage is based on the driving signal.

Example 6. The phase circuit of one of examples 1 to 5, where the synchronization circuit includes: a flip-flop configured to generate the driving signal; a first counter having a reset input configured to receive the first clock signal, a clock input configured to receive an oscillator signal, and an output configured to provide a reference ramp value; a first register having a load input configured to receive the first clock signal, an input configured to receive the reference ramp value, and an output configured to provide a peak value; a phase shift circuit configured to generate a phase shift value based on the peak value, the number of active phases and the identifier; a first comparator configured to set the flip-flop when the reference ramp value becomes higher than the phase shift value; a second counter having a reset input coupled to an output of the first comparator, a clock input configured to receive the oscillator signal, and an output configured to provide a shifted ramp value; and a second comparator configured to reset the flip-flop when the shifted ramp value becomes higher than the on-time value.

Example 7. The phase circuit of one of examples 1 to 6, further including an oscillator configured to generate the oscillator signal.

Example 8. The phase circuit of one of examples 1 to 4, where the synchronization circuit is configured to provide a second clock signal to the controller based on the start time, and where the controller is configured to control the switching of the bidirectional output stage based on the second clock signal.

Example 9. The phase circuit of one of examples 1 to 8, where the memory is configured to store a value indicative of the target current.

Example 10. The phase circuit of one of examples 1 to 9, where the controller includes the synchronization circuit.

Example 11. The phase circuit of one of examples 1 to 10, where the target current is a bidirectional target current.

Example 12. The phase circuit of one of examples 1 to 11, where the bidirectional output stage, the memory, and the synchronization circuit are integrated in an integrated circuit.

Example 13. The phase circuit of one of examples 1 to 12, where the memory is a register bank.

Example 14. The phase circuit of one of examples 1 to 13, further including a communication interface configured to be coupled to a processor, the communication interface configured to receive data indicative of the number of active phases and the identifier and program the number of active phases and the identifier into the memory based on the received data.

Example 15. The phase circuit of one of examples 1 to 14, further including a bidirectional disable circuit configured to receive a fault signal and to disable the bidirectional output stage when the fault signal is asserted.

Example 16. The phase circuit of one of examples 1 to 15, where the bidirectional disable circuit is configured to receive the fault signal from a processor.

Example 17. The phase circuit of one of examples 1 to 16, where the bidirectional output stage is configured to operate in buck mode to transfer energy from the first battery to the second battery, and in boost mode to transfer energy from the second battery to the first battery.

Example 18. A method for operating a bidirectional multi-phase DC/DC converter including N phase circuits, the method including: providing a first clock signal to the N phase circuits, where N is a positive integer greater than 1, where M of the N phase circuits are active phase circuits, and where each of the N phase circuits includes a bidirectional output stage coupled between a first battery and a second battery, and a memory storing a number M of active phase circuits of the N phase circuits, and a unique identifier; determining, for each of the M active phase circuits, a respective start time of a switching cycle of the respective bidirectional output stage based on the number M, the unique identifier, and the first clock signal; and operating each of the M active phase circuits with respective switching cycles based on the respective start times to generate respective output currents with the respective bidirectional output stages of the M active phase circuits.

Example 19. The method of example 18, where M is lower than N.

Example 20. The method of one of examples 18 or 19, further including, programming the number M of active phase circuits into each of the N phase circuits via a communication interface.

Example 21. The method of one of examples 18 to 20, further including, programming the unique identifiers to the memory of each of the N phase circuits via the communication interface.

Example 22. The method of one of examples 18 to 21, further including: programming a target current to the memory of each of the N phase circuits via a communication interface; and regulating, by each of the M active phase circuits, the respective output current based on the target current stored in the memory.

Example 23. A bidirectional multi-phase DC/DC converter including: N phase circuits, N being a positive integer greater than 1, where each of the N phase circuits includes: a bidirectional output stage configured to be coupled between a first battery and a second battery, a memory configured to store a number of active phases, and a unique identifier, a slave communication interface, and a synchronization circuit; and a processor including: a master communication interface coupled to the slave communication interface of each of the N phase circuits, and a timer configured to provide a first clock signal to each of the N phase circuits, where the synchronization circuit of each of the N phase circuits is configured to determine a respective start time of a switching cycle of the respective bidirectional output stage based on the number of active phases, the respective unique identifier, and the first clock signal, where each of the N phase circuits is configured to control the timing of the switching of the respective bidirectional output stage based on the respective start time.

Example 24. A bidirectional DC/DC converter including: A phase circuit including: a bidirectional output stage configured to be coupled between a first battery and a second battery, a memory configured to store a number of active phases, and a unique identifier, where the number of active phases is a positive integer greater than or equal to 1, a slave communication interface, and a synchronization circuit, and a processor including: a master communication interface coupled to the slave communication interface, and a timer configured to provide a first clock signal to the phase circuit, where the synchronization circuit is configured to determine a respective start time of a switching cycle of the bidirectional output stage based on the number of active phases, the unique identifier, and the first clock signal, where the phase circuit is configured to control the timing of the switching of the bidirectional output stage based on the start time.

Example 25. The converter of example 24, where the phase circuit includes a controller configured to regulate an output current of the bidirectional output stage based on a target current, where the synchronization circuit is configured to receive an on-time value from the controller, the synchronization circuit including: a flip-flop configured to generate a driving signal based on the on-time value and the start time, where the switching of the bidirectional output stage is based on the driving signal; a first counter having a reset input configured to receive the first clock signal, a clock input configured to receive an oscillator signal, and an output configured to provide a reference ramp value; a first register having a load input configured to receive the first clock signal, an input configured to receive the reference ramp value, and an output configured to provide a peak value; a phase shift circuit configured to generate a phase shift value based on the peak value, the number of active phases and the identifier; a first comparator configured to set the flip-flop when the reference ramp value becomes higher than the phase shift value; a second counter having a reset input coupled to an output of the first comparator, a clock input configured to receive the oscillator signal, and an output configured to provide a shifted ramp value; and a second comparator configured to reset the flip-flop when the shifted ramp value becomes higher than the on-time value.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A phase circuit comprising: a bidirectional output stage configured to be coupled between a first battery and a second battery; a memory configured to store a number of active phases, and an identifier; and a synchronization circuit configured to receive a first clock signal and determine a start time of a switching cycle of the bidirectional output stage based on the number of active phases, the identifier, and the first clock signal, wherein the phase circuit is configured to control the timing of the switching of the bidirectional output stage based on the start time, wherein the synchronization circuit comprises: a phase shift circuit configured to generate a phase shift value based on a peak value, the number of active phases and the identifier, a first comparator configured to set a flip-flop when a reference ramp value becomes higher than the phase shift value, a second counter having a reset input coupled to an output of the first comparator, a clock input configured to receive a oscillator signal, and an output configured to provide a shifted ramp value, and a second comparator configured to reset the flip-flop when the shifted ramp value becomes higher than an on-time value.

2. The phase circuit of claim 1, wherein the phase circuit is configured to disable the bidirectional output stage based on the identifier.

3. The phase circuit of claim 2, wherein the phase circuit is configured to, when the number of active phases is lower than the identifier, disable the bidirectional output stage.

4. The phase circuit of claim 1, further comprising a controller configured to regulate an output current of the bidirectional output stage based on a target current.

5. The phase circuit of claim 4, wherein the synchronization circuit is configured to receive the on-time value from the controller and generate a driving signal based on the on-time value, and the start time, wherein the switching of the bidirectional output stage is based on the driving signal.

6. The phase circuit of claim 5, wherein the synchronization circuit comprises: the flip-flop configured to generate the driving signal; a first counter having a reset input configured to receive the first clock signal, a clock input configured to receive the oscillator signal, and an output configured to provide the reference ramp value; and a first register having a load input configured to receive the first clock signal, an input configured to receive the reference ramp value, and an output configured to provide the peak value.

7. The phase circuit of claim 6, further comprising an oscillator configured to generate the oscillator signal.

8. The phase circuit of claim 4, wherein the synchronization circuit is configured to provide a second clock signal to the controller based on the start time, and wherein the controller is configured to control the switching of the bidirectional output stage based on the second clock signal.

9. The phase circuit of claim 4, wherein the memory is configured to store a value indicative of the target current.

10. The phase circuit of claim 4, wherein the controller comprises the synchronization circuit.

11. The phase circuit of claim 4, wherein the target current is a bidirectional target current.

12. The phase circuit of claim 1, wherein the bidirectional output stage, the memory, and the synchronization circuit are integrated in an integrated circuit.

13. The phase circuit of claim 1, wherein the memory is a register bank.

14. The phase circuit of claim 1, further comprising a communication interface configured to be coupled to a processor, the communication interface configured to receive data indicative of the number of active phases and the identifier and program the number of active phases and the identifier into the memory based on the received data.

15. The phase circuit of claim 1, further comprising a bidirectional disable circuit configured to receive a fault signal and to disable the bidirectional output stage when the fault signal is asserted.

16. The phase circuit of claim 15, wherein the bidirectional disable circuit is configured to receive the fault signal from a processor.

17. The phase circuit of claim 1, wherein the bidirectional output stage is configured to operate in buck mode to transfer energy from the first battery to the second battery, and in boost mode to transfer energy from the second battery to the first battery.

18. A method for operating a bidirectional multi-phase DC/DC converter comprising N phase circuits, the method comprising:
providing a first clock signal to the N phase circuits, wherein N is a positive integer greater than 1, wherein M of the N phase circuits are active phase circuits, and wherein each of the N phase circuits comprises a bidirectional output stage coupled between a first battery and a second battery, and a memory storing a number M of active phase circuits of the N phase circuits, and a unique identifier;
determining, for each of the M active phase circuits, a respective start time of a switching cycle of the respective bidirectional output stage based on the number M, the unique identifier, and the first clock signal; and
operating each of the M active phase circuits with respective switching cycles based on the respective start times to generate respective output currents with the respective bidirectional output stages of the M active phase circuits.

19. The method of claim 18, wherein M is lower than N.

20. The method of claim 18, further comprising, programming the number M of active phase circuits into each of the N phase circuits via a communication interface.

21. The method of claim 20, further comprising, programming the unique identifiers to the memory of each of the N phase circuits via the communication interface.

22. The method of claim 18, further comprising:
programming a target current to the memory of each of the N phase circuits via a communication interface; and
regulating, by each of the M active phase circuits, the respective output current based on the target current stored in the memory.

23. A bidirectional multi-phase DC/DC converter comprising:
N phase circuits, N being a positive integer greater than 1, wherein each of the N phase circuits comprises:
a bidirectional output stage configured to be coupled between a first battery and a second battery,
a memory configured to store a number of active phases, and a unique identifier,
a slave communication interface, and
a synchronization circuit; and
a processor comprising:
a master communication interface coupled to the slave communication interface of each of the N phase circuits, and
a timer configured to provide a first clock signal to each of the N phase circuits, wherein the synchronization circuit of each of the N phase circuits is configured to determine a respective start time of a switching cycle of the respective bidirectional output stage based on the number of active phases, the respective unique identifier, and the first clock signal, wherein each of the N phase circuits is configured to control the timing of the switching of the respective bidirectional output stage based on the respective start time.

24. A bidirectional DC/DC converter comprising: a phase circuit comprising: a bidirectional output stage configured to be coupled between a first battery and a second battery, a memory configured to store a number of active phases, and a unique identifier, wherein the number of active phases is a positive integer greater than or equal to 1, a slave communication interface, and a synchronization circuit; and a processor comprising: a master communication interface coupled to the slave communication interface, and a timer configured to provide a first clock signal to the phase circuit, wherein the synchronization circuit is configured to determine a respective start time of a switching cycle of the bidirectional output stage based on the number of active phases, the unique identifier, and the first clock signal, wherein the phase circuit is configured to control the timing of the switching of the bidirectional output stage based on the start time, wherein the synchronization circuit comprises: a phase shift circuit configured to generate a phase shift value based on a peak value, the number of active phases and the identifier, a first comparator configured to set a flip-flop when a reference ramp value becomes higher than the phase shift value, a second counter having a reset input coupled to an output of the first comparator, a clock input configured to receive a oscillator signal, and an output configured to provide a shifted ramp value, and a second comparator configured to reset the flip-flop when the shifted ramp value becomes higher than an on-time value.

25. The converter of claim 24, wherein the phase circuit comprises a controller configured to regulate an output current of the bidirectional output stage based on a target current, wherein the synchronization circuit is configured to receive the on-time value from the controller, the synchronization circuit comprising: the flip-flop configured to generate a driving signal based on the on-time value and the start time, wherein the switching of the bidirectional output stage is based on the driving signal; a first counter having a reset input configured to receive the first clock signal, a clock input configured to receive the oscillator signal, and an output configured to provide the reference ramp value; and a first register having a load input configured to receive the first clock signal, an input configured to receive the reference ramp value, and an output configured to provide a peak value.

* * * * *